United States Patent
Mamber et al.

(10) Patent No.: US 7,073,606 B2
(45) Date of Patent: Jul. 11, 2006

(54) MANUAL MACHINE TOOL

(75) Inventors: Juergen Mamber, Leinfelden-Echterdingen (DE); Holger Schweizer, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 388 days.

(21) Appl. No.: 10/048,880

(22) PCT Filed: Mar. 30, 2001

(86) PCT No.: PCT/DE01/01265

§ 371 (c)(1),
(2), (4) Date: Feb. 4, 2002

(87) PCT Pub. No.: WO01/98035

PCT Pub. Date: Dec. 27, 2001

(65) Prior Publication Data

US 2002/0153147 A1 Oct. 24, 2002

(30) Foreign Application Priority Data

Jun. 17, 2000 (DE) ......................................... 100 29 898

(51) Int. Cl.
*B25D 17/00* (2006.01)

(52) U.S. Cl. .......................... 173/93.5; 173/93; 173/48; 173/216

(58) Field of Classification Search ................... 173/48, 173/93, 93.5, 104, 164, 176, 213, 216, 217
See application file for complete search history.

(56) References Cited

U.S. PATENT DOCUMENTS

| 1,915,542 | A | | 6/1933 | Lundin et al. | |
|---|---|---|---|---|---|
| 2,873,832 | A | * | 2/1959 | Gilder | 192/223.1 |
| 2,995,226 | A | * | 8/1961 | Happe | 192/223.1 |
| 3,021,723 | A | * | 2/1962 | Happe | 74/527 |
| 3,030,818 | A | | 4/1962 | Zagar | |
| 3,110,381 | A | * | 11/1963 | Leu | 192/223.2 |

(Continued)

FOREIGN PATENT DOCUMENTS

| DE | 43 05 965 A1 | 9/1994 |
|---|---|---|
| DE | 297 15 257 U1 | 1/1998 |
| DE | 198 03 454 A1 | 8/1999 |
| EP | 0 612 588 A1 | 8/1994 |
| EP | 0 792 723 A | 9/1997 |
| EP | 0 909 614 A | 4/1999 |
| GB | 2 327 054 A | 1/1999 |
| WO | 99 10132 A | 3/1999 |

*Primary Examiner*—Scott A. Smith
*Assistant Examiner*—Nathaniel Chukwurah
(74) *Attorney, Agent, or Firm*—Michael J. Striker

(57) ABSTRACT

The invention is based on a power tool comprising toolholder (12, 102) driveable in at least rotary fashion via a drive motor and via a driven shaft (10, 98, 100), which comprises a workholding fixture (14) for attaching tools (16, 104) actuatable in the direction of rotation of the driven shaft (10, 98, 100), and comprising a locking device (18, 86, 90), via which the driven shaft (10, 98, 100) is coupleable in torsion-resistant fashion for locking and releasing the workholding fixture (14) to and from a housing part (20, 106), and which opens automatically when torque is transferred from the drive motor to the toolholder (12, 102), and which locks automatically when torque is transferred from the toolholder (12, 102) to the drive motor.

It is proposed that the locking device (18, 86, 90) is located on the driven shaft (10, 98, 100).

25 Claims, 8 Drawing Sheets

U.S. PATENT DOCUMENTS

| | | | | |
|---|---|---|---|---|
| 3,243,023 A | * | 3/1966 | Boyden | 192/223.2 |
| 3,329,185 A | | 7/1967 | Hettich et al. | |
| 3,334,448 A | * | 8/1967 | Alexander | 451/359 |
| 3,433,081 A | | 3/1969 | Bitter et al. | |
| 3,436,994 A | | 4/1969 | Diener | |
| 3,517,574 A | | 6/1970 | Glatfelter | |
| 3,679,244 A | * | 7/1972 | Reddy | 403/109.3 |
| 3,998,278 A | | 12/1976 | Stiltz et al. | |
| 4,081,704 A | | 3/1978 | Vassos et al. | |
| 4,277,074 A | * | 7/1981 | Kilberis | 279/60 |
| 4,317,578 A | * | 3/1982 | Welch | 279/60 |
| 4,400,995 A | * | 8/1983 | Palm | 74/527 |
| 4,467,896 A | * | 8/1984 | Sauerwein et al. | 188/69 |
| 4,489,525 A | * | 12/1984 | Heck | 451/344 |
| 4,682,918 A | * | 7/1987 | Palm | 408/241 R |
| 4,706,791 A | | 11/1987 | Magliano | |
| 4,754,669 A | * | 7/1988 | Verdier et al. | 81/57.14 |
| 4,878,405 A | * | 11/1989 | Wolfe | 81/57.31 |
| 5,016,501 A | * | 5/1991 | Holzer, Jr. | 81/57.11 |
| 5,016,591 A | | 5/1991 | Nanyoshi et al. | |
| 5,496,139 A | * | 3/1996 | Ghode et al. | 409/182 |
| 5,624,013 A | * | 4/1997 | Tsai | 192/223.1 |
| 5,788,021 A | * | 8/1998 | Tsai | 188/67 |
| 5,947,254 A | * | 9/1999 | Jones | 192/223.2 |
| 5,984,022 A | * | 11/1999 | Harman et al. | 173/176 |
| 6,010,426 A | * | 1/2000 | Nakamura | 477/22 |
| 6,035,947 A | * | 3/2000 | Chung | 173/93.5 |

* cited by examiner

MANUAL MACHINE TOOL

RELATED ART

The invention is based on a power tool comprising a toolholder driveable in at least a rotary fashion via drive motor and via a driven shaft, which comprises a workholding fixture for attaching tools actuable in the direction of rotation of the driven shaft, and comprising a locking device, via which the driven shaft is coupleable to and from a housing part in a torsion-resistant fashion for locking and releasing the workholding fixture, and which opens automatically when torque is transferred from the drive motor to the toolholder, and which locks automatically when torque is transferred from the toolholder to the drive motor.

A hammer drill having a drive motor located in a housing and outfitted with a locking device was made known in DE 198 03 454 A1. Using the locking device, a drilling spindle drivable by the drive motor is lockable to the housing of the hammer drill in torsion-resistant fashion, so that a drill chuck screwed together with the drilling spindle can be released from the drilling spindle and/or a tool can be keylessly clamped into the drill chuck. The locking device is located on an intermediate shaft that is coupleable to the drilling spindle via two gear steps.

The locking device opens automatically when torque is transferred from the drive motor to the drill chuck and locks automatically when torque is transferred from the drill chuck to the drive motor.

ADVANTAGES OF THE INVENTION

It is proposed that the locking device is located on the driven shaft. The means of attaining the object of the invention can thereby be used advantageously in power tools without intermediate shaft, such as with single-pass drills or hammer drills, etc., in particular. Using the locking device, tools can be keylessly clamped into and released from the toolholder, in particular in a toolholder designed as drill chuck. Moreover, a toolholder can be easily screwed onto the driven shaft and unscrewed from the driven shaft. The driven shaft can be designed as one- or two-pieced, or integrated with a drive shaft of the drive motor.

If one part of the locking device is formed by a toothed gear located on the driven shaft, via which the driven shaft is driveable, then components, space, installation expense, and costs can be saved in advantageous fashion. Generally speaking, the locking device can also be formed out of additional components as well.

The locking device can be realized by means of various coupling types appearing practical to one skilled in the art. A particularly simple, space-saving and cost-effective design having few components can be achieved using a claw clutch, however, that comprises at least one claw that is secured in the toothed gear. The claw is preferably formed by a bolt having a round cross-sectional area. Bolts of this type can be advantageously designed as cost-effective standard components and can further be secured in recesses producible in cost-effective fashion, e.g., in bore holes.

In a further embodiment of the invention, it is further proposed that the locking device comprise a washer that comprises at least one driving element for transferring torque, and the washer is located on a first seat of the roller bearing of the driven shaft in torsion-resistant fashion, and the toothed gear is located on a second seat of the roller bearing of the driven shaft in rotatable fashion. An advantageously space-saving and cost-effective design having a one-part driven shaft, in particular, can be achieved. Generally speaking, the washer can also be located on the driven shaft in rotatable fashion and the toothed gear can be located on the driven shaft in torsion-resistant fashion.

Components can be further spared by fixing the driven shaft in position in at least one axial direction via the washer, e.g., by pressing the washer preferably onto the driven shaft and fixing it in position in at least one axial direction via a stop that can be formed by a housing part, for example.

The driven shaft has a cross-section deviating from a cylindrical shape, preferably in the region of the first seat of the roller bearing, to form a geometrical positive connection with the washer. The washer can thereby be connected particularly securely to the driven shaft in torsion-resistant fashion without additional components. Generally speaking, however, the washer can also be secured in torsion-resistant fashion to the driven shaft via other non-positive, positive, and/or bonded connections appearing practical to one skilled in the art, such as pressing on, etc.

In a further embodiment, it is further proposed that the washer is located on a side of the toothed gear facing the toolholder. Using minimal design changes, existing, sophisticated designs can be utilized. In hammer drills in particular, an impact mechanism can be located in standard fashion on the side of the toothed gear opposite to the toolholder.

To further save space, additional components, and installation expense, the driven shaft is advantageously supported in an arresting position of the locking device in the direction of rotation via the washer and via at least one body in a component or in a housing part, via which component, moreover, bearing forces of the driven shaft are supported in the maching housing. In the arresting position of the locking device, the washer is preferably supported in a washer connected in torsion-resistant fashion to a housing part or directly in the housing via one or more rolling elements. An additional washer can be coordinated in advantageous fashion in terms of the material specifically with the stresses that occur. When support takes place directly in a housing part, additional components, space, and weight can be saved.

The bearing forces can be supported directly in the component or they can be supported advantageously in the component or housing part via a pot-shaped component designed separate from the housing part. The separately-designed, pot-shaped component can advantageously be produced out of metal or a highly loadable material having a thin wall thickness, by way of which space can be saved. Moreover, the separate, pot-shaped component can be adapted cost-effectively to different embodiments having different bearings, e.g., to embodiments having needle roller bearings and embodiments having sliding bearings, etc.

Moreover, the means of achieving the object according to the invention is usable especially advantageously in grinders, in angle grinders in particular. A locking device to be operated manually can be spared, the space can be reduced, and comfort can be increased. In angle grinder, the locking device can be located before or after an angular gear. If the locking device is located before the angular gear, high speeds usually occur at the locking device, but so do low torques, so the locking device can be designed to be space-saving and low-weight. If the locking device if located after the angular gear, low speeds and high torques occur at the locking device, but the angular gear can be protected from high torques during installation and removal of a bit insert.

Depending on the design and area of application of the manually-guided angle grinder, one or the other alternative can be advantageous.

If at least one part of the locking device, in particular a locking ring, is rigidly connected to this component by means of the manufacture of a component of the angular gear, the installation expense can be reduced. If the locking ring is injected into a component of the angular gear, advantageously into a plastic bearing flange, the locking ring—despite an overall lightweight design and a realizable, simple installation—can be produced out of a hard material adapted for its function, e.g., out of hardened metal. Generally speaking, the locking ring can also be designed integral with a housing part, however, or it can be connected to this in non-positive, positive, and/or bonded fashion after its manufacture.

BRIEF DESCRIPTION OF THE DRAWING

Further advantages result from the following description of the drawing. The drawing, the description, and the claims contain numerous features in combination. One skilled in the art will advantageously consider them individually as well and combine them into reasonable further combinations.

DETAILED DESCRIPTION OF THE EXEMPLARY EMBODIMENTS

Figure 1:
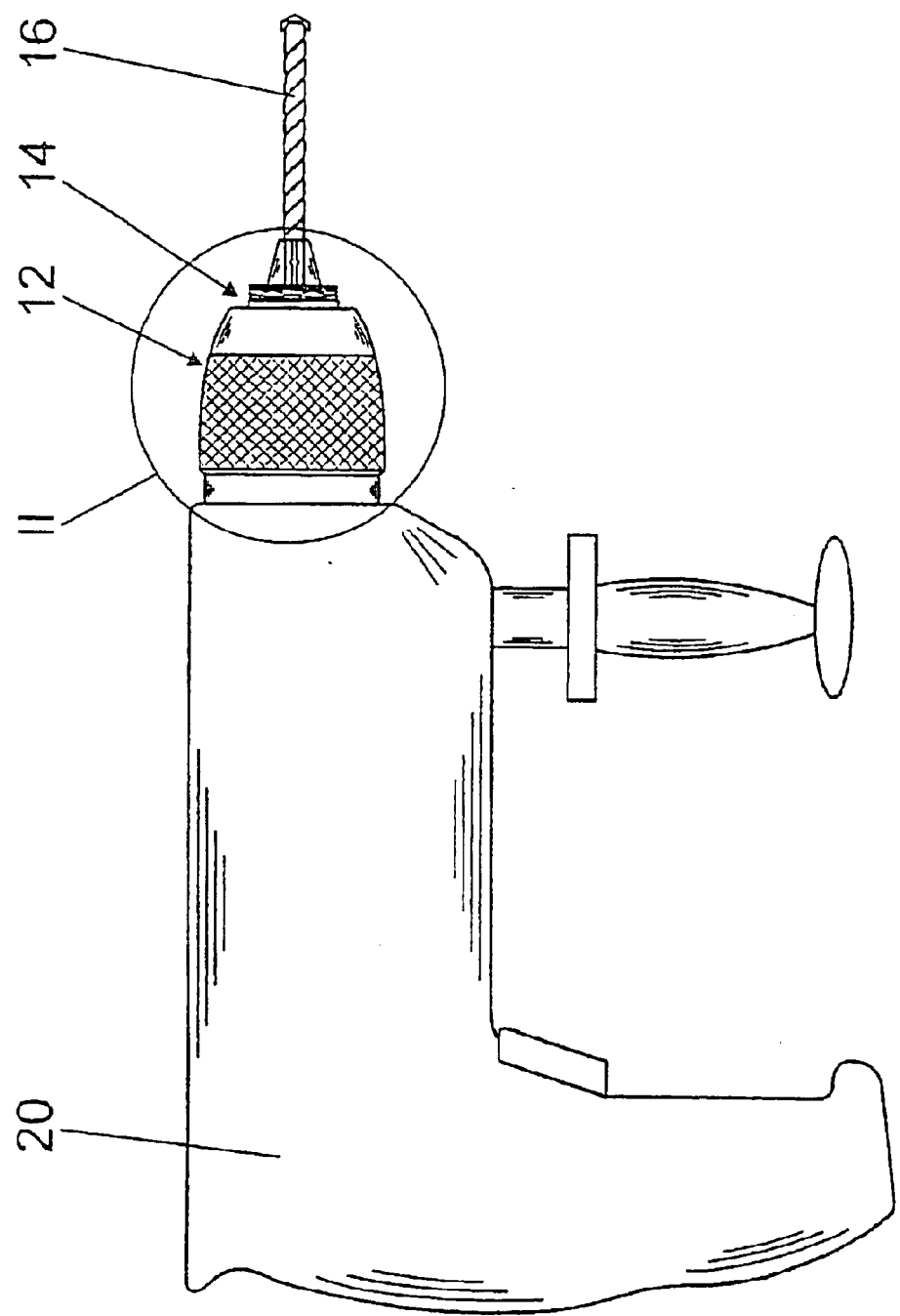
FIG. 1 shows a schematic representation of a hammer drill.
Figure 2:
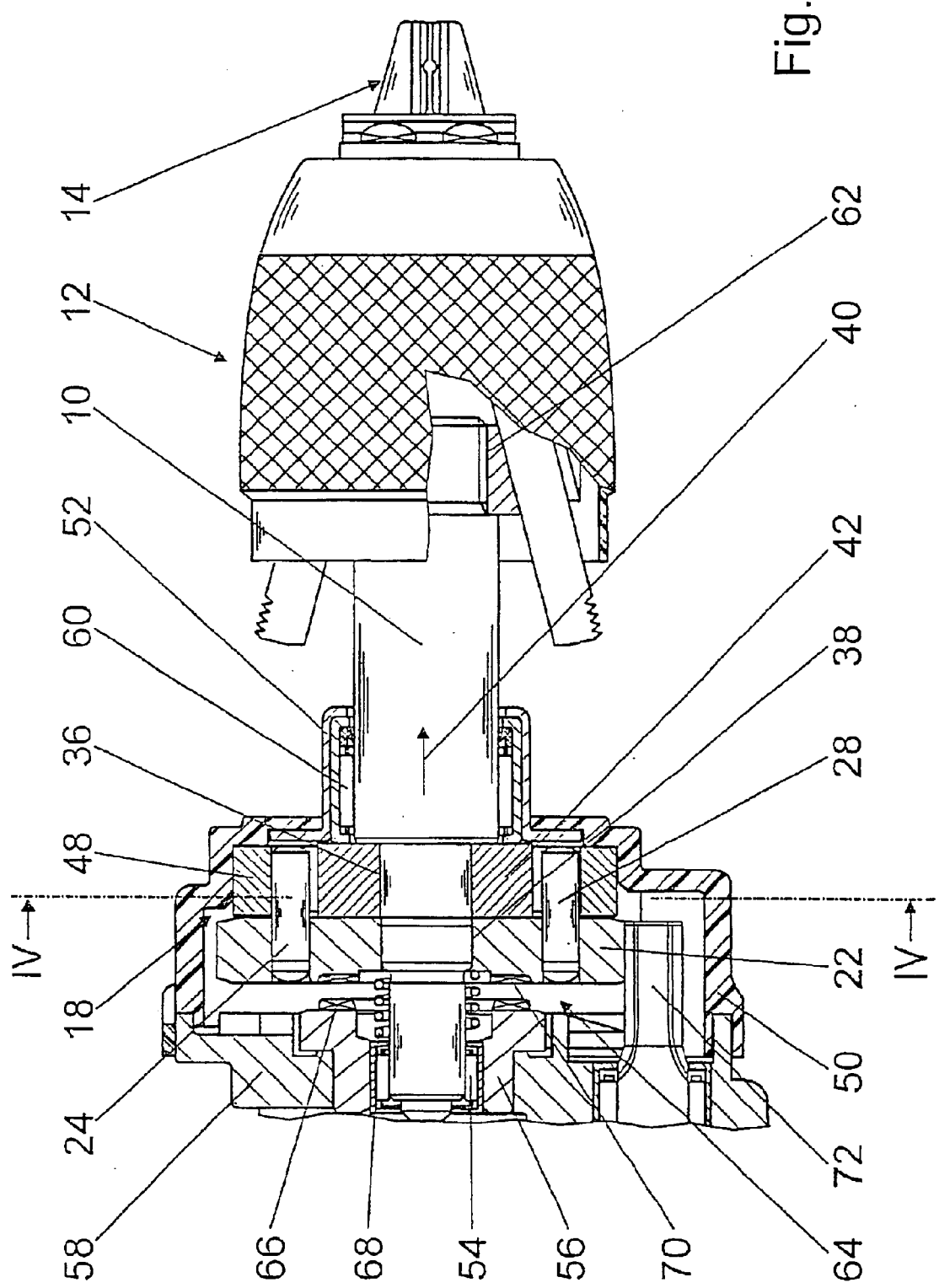
FIG. 2 shows an enlarged section II from FIG. 1 in a longitudinal view.
Figure 3:
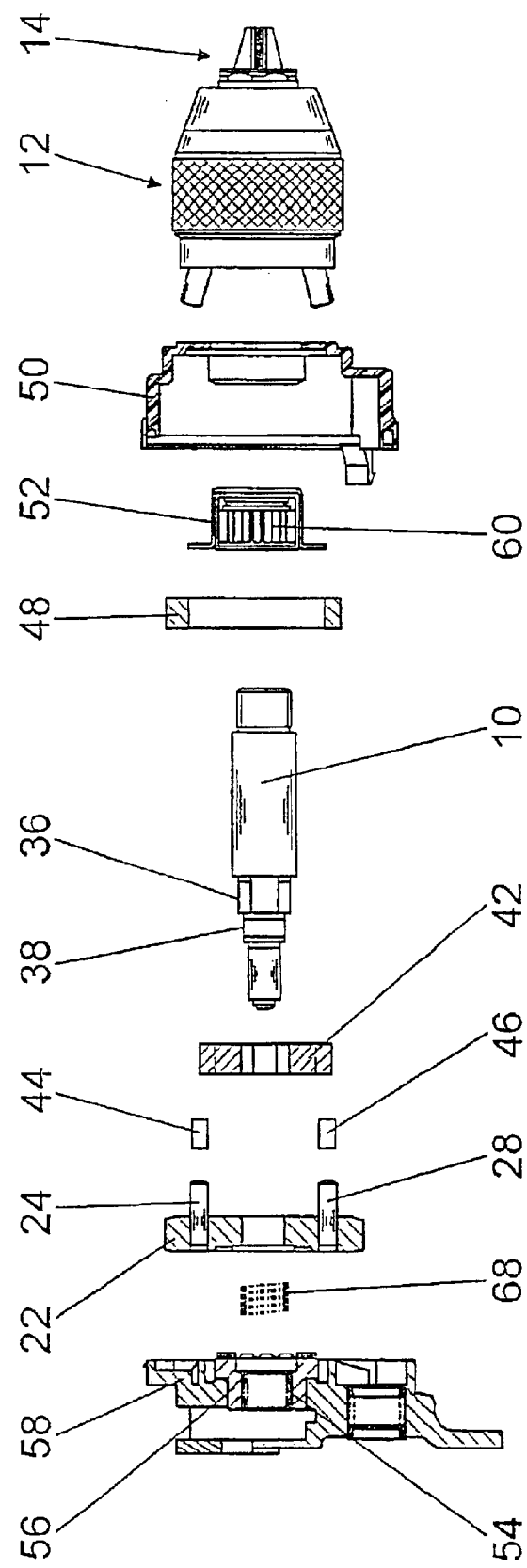
FIG. 3 shows an exploded diagram of components from FIG. 2.

FIG. 1 shows a schematically-represented hammer drill comprising a drive motor located in a machine housing 20 and not shown further, by means of which a spur-toothed wheel 22 located on a drilling spindle 10 via a drive shaft 72, and a quick-action drill chuck 12 is driveable in rotating and impacting fashion via the drilling spindle 10 (FIGS. 1, 2, and 3).

The drilling spindle 10 is supported in a needle roller bearing 54 on the side of the spur-toothed wheel 22 opposite to the drill chuck 12, which needle roller bearing 54 is supported in the machine housing 20 via a locking disc 56 of a latching impact mechanism 64 and via a bearing bracket 58. The locking disc 56, with its detents, can be brought into connection with detents 70 integrally molded to the spur-toothed wheel via a switching device (not shown) in axial direction 40 against a compression spring 68. The drilling spindle 10 is supported in a needle roller bearing 60 on the side of the spur-toothed wheel 22 facing the drill chuck 12, which needle roller bearing 60 is supported in the machine housing 20 via a pot-shaped plate part 52 and via a plastic gearbox cover 50.

The drill chuck 12 is connected to the drilling spindle via a threaded joint 62 and comprises a workholding fixture 14 for attaching bits 16, which workholding fixture 14 is actuatable in the direction of rotation of the drilling spindle 10. Moreover, the hammer drill comprises a locking device 18 via which the drilling spindle 10 is coupleable in torsion-resistant fashion for releasing and locking the workholding fixture 14 from and to the machine housing 20, and which opens automatically when torque is transferred from the drive motor to the drill chuck 12 and locks automatically when torque is transferred from the drill chuck 12 to the drive motor.

According to the invention, the locking device 18 designed as claw clutch is located on the drilling spindle 10. A part of the locking device 18 is formed by the spur-toothed wheel 22 supported in rotatable fashion on a seat of the roller bearing on the drilling spindle 10, via which spur-toothed wheel 22 the drilling spindle 10 is driveable by the drive motor. Four claws 24, 26, 28, 30—each of which has a round cross-sectional area, are designed as bolts, and are situated parallel to the axis—are pressed into bore holes in the spur-toothed wheel 22.

Figure 4:
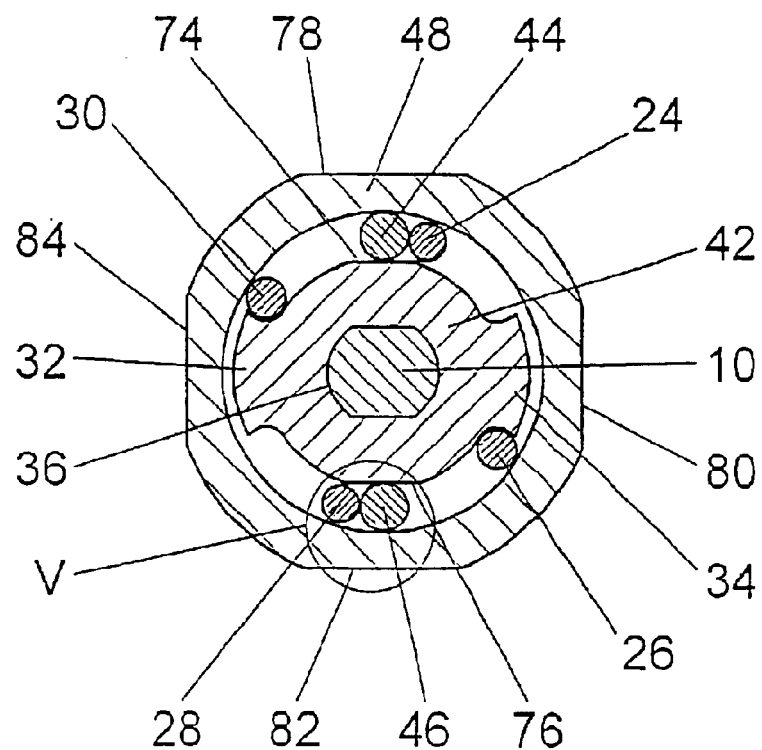
FIG. 4 shows a view along the line IV–IV in FIG. 2, in an opening position of a locking device.

The locking device 18 further comprises a washer 42 pressed onto the drilling spindle 10 on the side of the spur-toothed wheel 22 facing the drill chuck 12, on which washer 42 two driving elements 32, 34 extending in the radial direction for transferring torque are integrally molded (FIGS. 2 and 4). The driving elements 32, 34 are shaped in such a fashion that the washer 42 is rotatable with limitation between the adjacent claws 24, 26, 28, 30.

The washer 42 has a nearly cylindrical basic shape on its outer circumference abutting the driving elements 32, 34, which transitions into one flat spot 74, 76 each in the center between the adjacent driving elements 32, 34. The washer 42 is surrounded by a locking ring 48 that comprises a cylindrical basic shape having four flat spots 78, 80, 82, 84, via which it is held with positive engagement in torsion-resistant fashion in the gearbox cover 50. Due to the flat spots 74, 76 of the washer 42, the locking ring 48 comprises a different radial distance from the washer 42 and, in fact, a larger radial distance in the region of the flat spots 74, 76, and a smaller radial distance in the region of the cylindrical basic shape. The claws 24, 26, 28, 30 have a slight motional play in the region of the cylindrical basic shape of the washer 42.

In the center region of the flat spots 74, 76 of the washer 42, cylindrical rolling elements 44, 46 are accommodated with slight motional play between the washer 42 and the locking ring 48, the diameter of which is greater than a diameter of the claws 24, 26, 28, 30.

The washer 42 is pressed onto a seat of the roller bearing 36 of the drilling spindle 10, and the drilling spindle 10 has a cross-section deviating from a cylindrical shape in the region of the seat of the roller bearing 36 of the washer 42 to form a geometrical positive connection in the direction of rotation with the washer 42 (FIG. 4). The drilling spindle 10 is fixed in position in an axial direction 40 via the washer 42 and, in fact, in the direction 40 of the drill chuck 12 via a stop formed by the gearbox cover 50. The gearbox cover 50 is situated rigidly in the machine housing 20.

Figure 5:
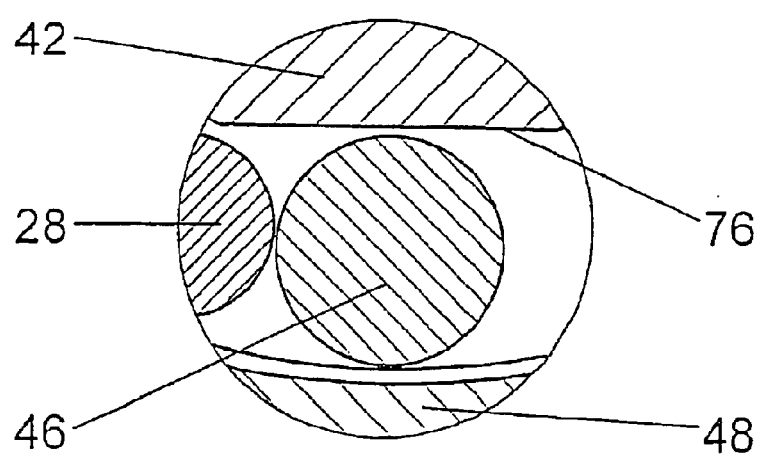
FIG. 5 shows an enlarged view V in FIG. 4.

If the drive motor drives the spur-toothed wheel via the drive shaft 72, the torque is transferred from the spur-toothed wheel 22 via the claws 24, 26, 28, 30 to the washer 42, and from the washer 42 via the drilling spindle 10 to the drill chuck 12. While the claws 26, 30 grip the driving elements 32, 34 and the torque is transferred to the washer 42, the claws 24, 28 are located in front of the rolling elements 44, 46 in the direction of rotation and hold them in the center region of the flat spots 74, 76, in/which the rolling elements 44, 46 have a minimal motional play toward the washer 42 and the locking ring 48 (FIGS. 4 and 5). A jamming of the rolling elements 44,46 is prevented, and the locking device 18 is opened.

Figure 6:
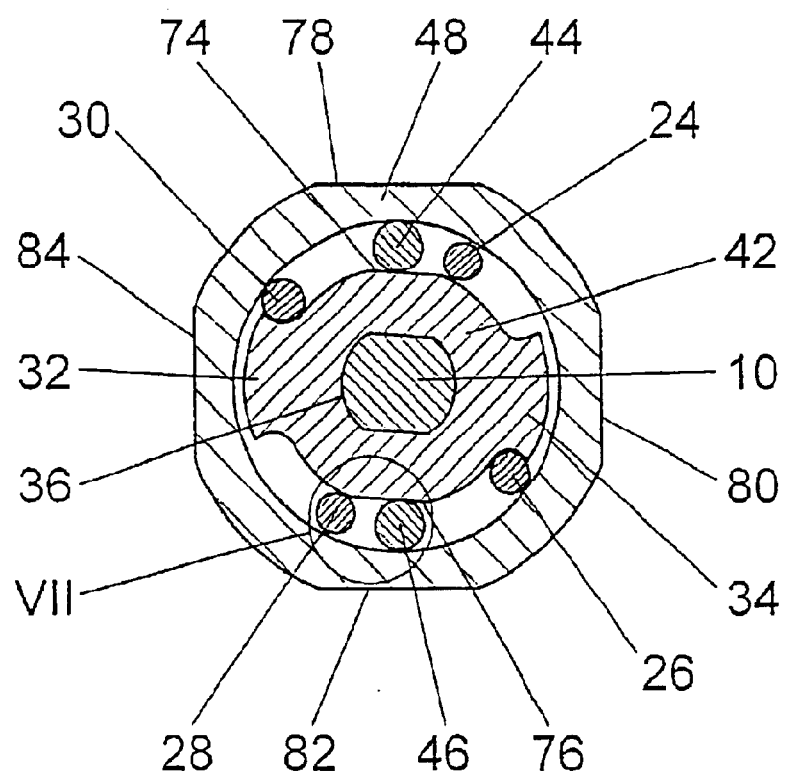
FIG. 6 shows a view along the line IV–IV in FIG. 2 in an arresting position of the locking device.
Figure 7:
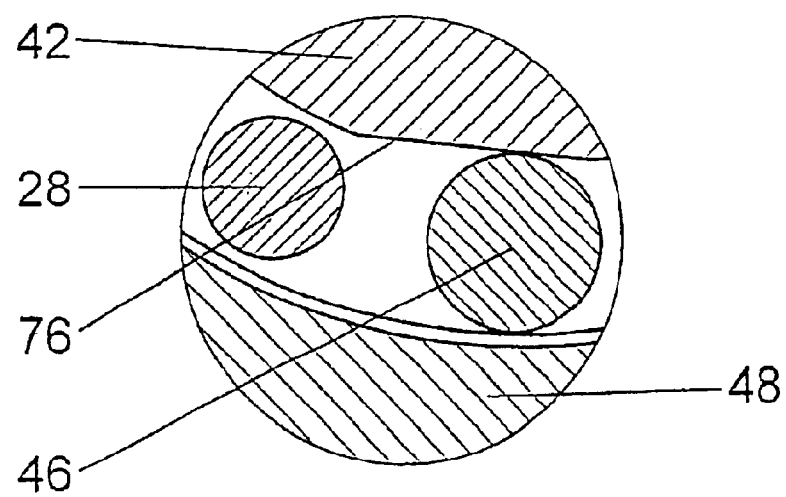
FIG. 7 shows an enlarged view VII in FIG. 6.

If, when the drive motor is switched off, a torque is transferred from the drill chuck 12 via the drilling spindle 10 to the washer 42, the driving elements 32, 34 serve to transfer torque to the claws 26, 30 (FIG. 6). Due to their inertia, the rolling elements 44, 46 are forced into a boundary region of the flat spots 74, 76 and become stuck between the locking ring 48 and the washer 42 (FIGS. 6 and 7). The drilling spindle 10 is supported in torsion-resistant fashion in the gearbox cover 50 via the washer 42, the rolling elements 44, 46, and via the locking ring 48. The drilling spindle 10 is automatically locked in place rigidly in the housing. Bits 16 can be clamped and released in the drill chuck 12, and/or the drill chuck 12 can be screwed onto the drilling spindle 10 or screwed off of the drilling spindle 10 without reaction torque having to be applied by hand.

The locking device 18 is designed symmetrically, so that a torque can be transferred from the drive motor in both directions via the locking device 18 to the drilling spindle 10 and the drill chuck 12. The locking device 18 opens automatically in both directions. Moreover, when the drive motor is switched off, the locking device 18 locks in both directions of rotation when a torque is transferred from the drill chuck 12 to the washer 42 via the drilling spindle 10.

Figure 8:
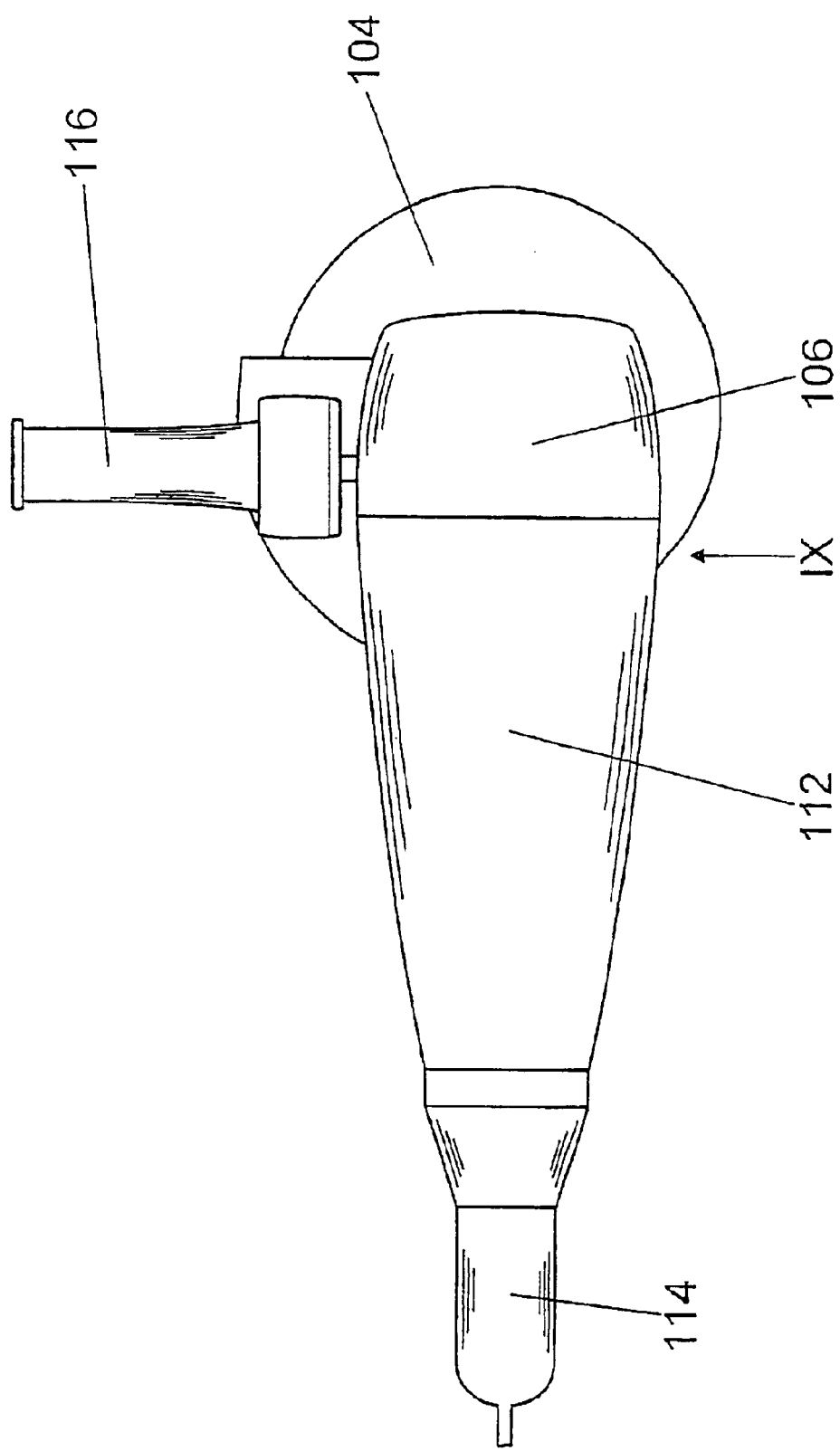
FIG. 8 shows an angle grinder from above.

FIG. 8 shows an angle grinder from above having an electric motor (not shown) supported in a housing 112. The angle grinder is guideable via a first handle 114 extending in the longitudinal direction and integrated in the housing 112 on the side opposite to an abrasive cutoff wheel 104, and via a second handle 116 extending transverse to the longitudinal direction and attached to a gearbox housing 106 in the region of the abrasive cutoff wheel 104.

Figure 9:
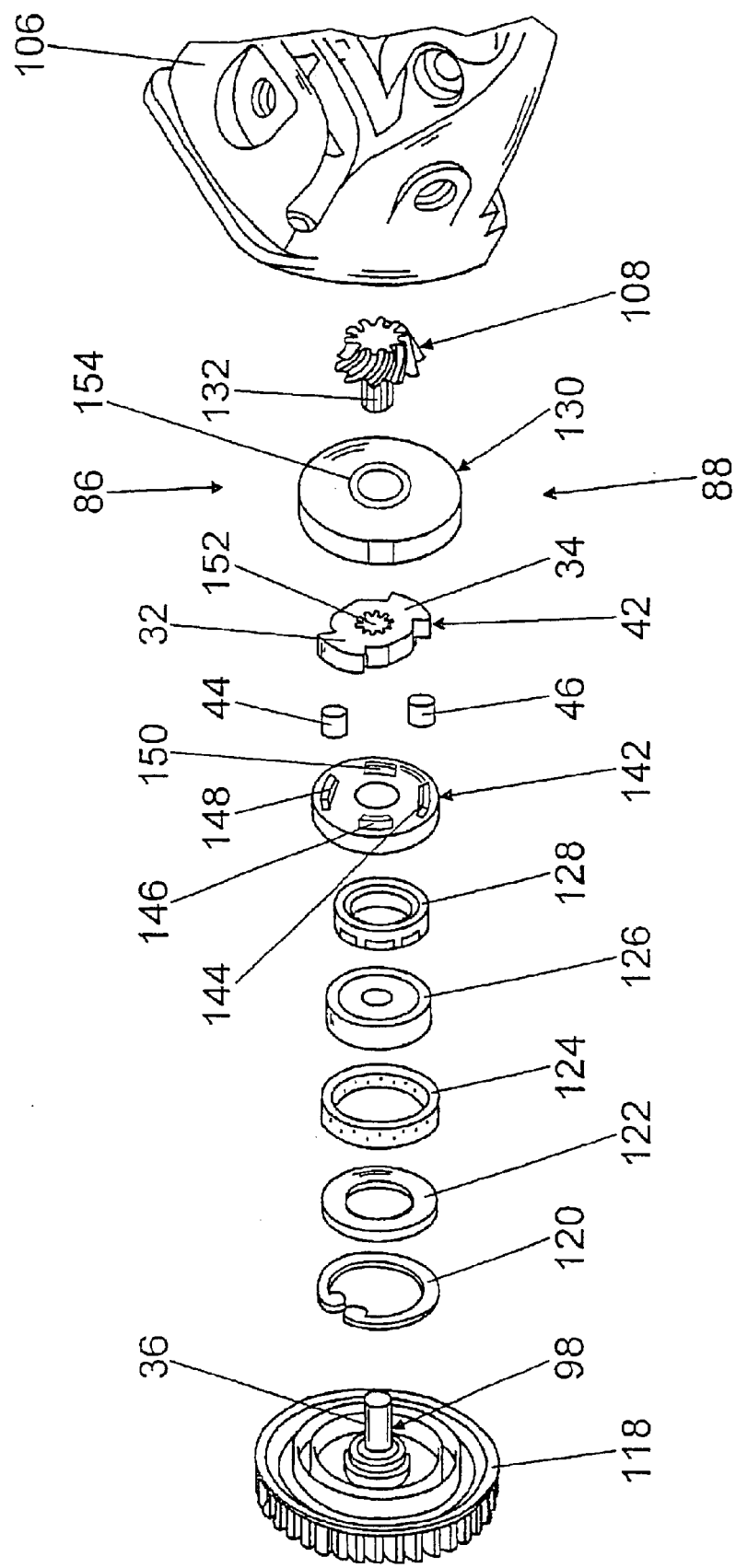
FIG. 9 shows an exploded diagram of a region labelled "IX" in FIG. 8.

FIG. 9 shows an exploded drawing of a region of the angle grinder labelled "IX" in FIG. 8 having a locking device 86. In the exemplary embodiments presented, components that are essentially identical are basically labelled with the same reference numerals. Moreover, the description of the exemplary embodiment in FIGS. 1 through 7 can be referred to with regard for features and functions that remain the same.

The locking device 86 is located on a driven shaft 98 of the electric motor of the angle grinder and, in fact, in the power flux of the electric motor in front of an angular gear 88 of the angle grinder. Starting at a fan wheel 118, a snapring 120 is located on the driven shaft 98 of the electric motor for axial fixation, followed by a shim 122 to form an axial supporting surface, a felt ring 124 having lubricant, a ball bearing 126 for supporting the driven shaft 98, a rubber ring 128 for the dampened support of the ball bearing 126, and a driven pulley 142 having four claws 144, 146, 148, 150, which, in the assembled state, is connected to the driven shaft 98 in torsion-resistant fashion via a seat of the roller bearing 36. A washer 42 having two driving elements 32, 34 and two cylindrical rolling elements 44, 46 are located in a plane of the claws 144, 146, 148, 150. The washer 42 is surrounded radially outward by a locking ring 130 supported in the gearbox housing 106 in torsion-resistant fashion, and is connected to a splined shaft 132 of a pinion 108 in torsion-resistant fashion via internal toothing 152. The pinion 108 is supported in the locking ring 130 in rotatable fashion via a sliding bearing 154.

Simple assembly can be achieved by means of the connection via the internal toothing 152 and the splined shaft 132. Generally speaking, the pinion could also be rigidly connected to the washer, however. The angular gear 88 is driven on a grinding spindle via the pinion 108 via a ring gear (not shown).

The locking device 86 basically has the same operating principle as the locking device 18. A drive torque of the electric motor is transferred from the driven shaft 98, via the driven pulley 142, the claws 144, 146, 148, 150, the driving elements 32, 34 of the washer 42 to the pinion 108, and from the pinion 108 to the grinding spindle via the ring gear (not shown). A torque from the grinding spindle in the direction of the electric motor, on the other hand, is supported via the ring gear, via the pinion 108, via the washer 42, the rolling elements 44, 46, and via the locking ring 130 in the gearbox housing 106. The grinding spindle is locked for installation and removal of the abrasive cutoff wheel 104.

Figure 10:
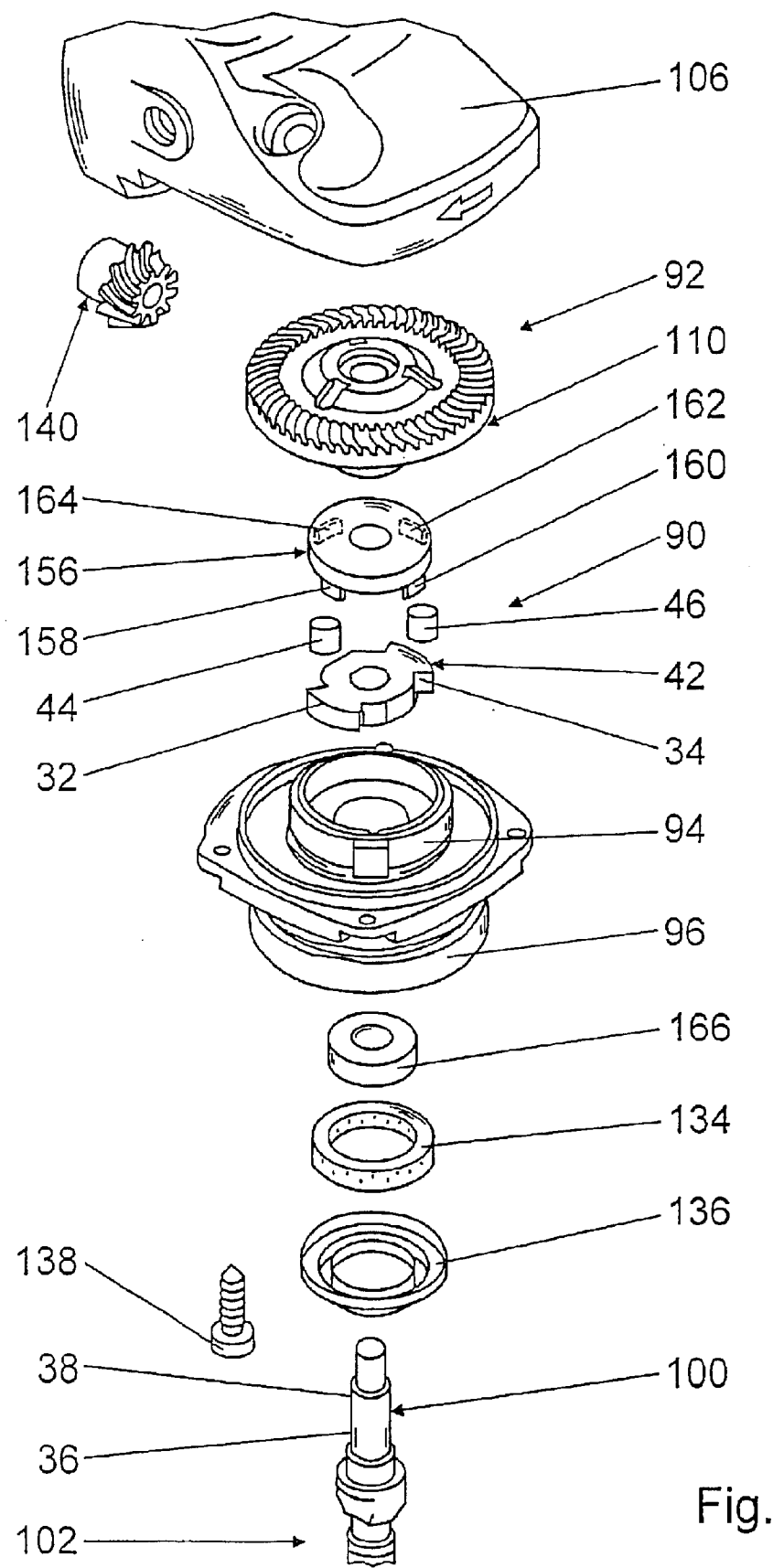
FIG. 10 shows a variant of FIG. 9.

FIG. 10 shows an alternative to the exemplary embodiment in FIG. 9 having a locking device 90. The locking device 90 is located on a driven shaft 100 of an angular gear 92 or on a grinding spindle. Starting at a ring gear 110 of the angular gear 92, a driven pulley 156 is located on the driven shaft 100 in the direction of a toolholder 102 integrally molded to the driven shaft 100, which driven pulley 156 is connected in torsion-resistant fashion to the ring gear 110. Four claws 158, 160, 162, 164 extending in the direction of the toolholder 102 are integrally molded on the driven pulley 156. A washer 42 having two driving elements 32, 34 and two cylindrical rolling elements 44, 46 are located in a plane of the claws 158, 160, 162, 164. A locking ring 94 of the locking device 90 is injected into a plastic bearing flange 96 of the angular gear 92 in torsion-resistant fashion, which plastic bearing flange 96 is fixable in position to a gearbox housing 106 of the angular gear 92 via four fastening screws 138. Moreover, a pressed-on ball bearing 166, a felt ring 134 having lubricant, and a dust cap 136 are located on the driven shaft 100.

The locking device 90 has the same operating principle as the locking device 18, and the washer 42 is located on a seat of the roller bearing 36 on the driven shaft 100 in torsion-resistant fashion, and the ring gear 110 is located on a seat of the roller bearing 36 on the driven shaft 100 in rotatable fashion. A drive torque of the electric motor is transferred via a pinion 140, the ring gear 110, via the driven pulley 156, the claws 158, 160, 162, 164, and via the driving elements 32, 34 of the washer 42 to the driven shaft 100. A torque from the driven shaft 100 in the direction of the electric motor is supported at the gearbox housing 106 via the washer 42, the rolling elements 44, 46, via the locking ring 94, via the bearing flange 96, and via the fastening screws 158.

In contrast to the locking device 86 in the exemplary embodiment in FIG. 9, the locking device 90 is located in the power flux of the electric motor after the angular gear 92 of the angle grinder.

| Reference Numerals | |
| --- | --- |
| 10 Driven shaft | 56 Locking disc |
| 12 Toolholder | 58 Bearing bracket |
| 14 Workholding fixture | 60 Needle roller bearing |
| 16 Tool | 62 Threaded joint |
| 18 Locking device | 64 Latching impact mechanism |
| 20 Machine housing | 66 Detents |
| 22 Toothed gear | 68 Compression spring |
| 24 Claw | 70 Detents |

-continued

Reference Numerals

| | | | |
|---|---|---|---|
| 26 | Claw | 72 | Drive shaft |
| 28 | Claw | 74 | Flat spot |
| 30 | Claw | 76 | Flat spot |
| 32 | Driving element | 78 | Flat spot |
| 34 | Driving element | 80 | Flat spot |
| 36 | Seat of the roller bearing | 82 | Flat spot |
| 38 | Seat of the roller bearing | 84 | Flat spot |
| 40 | Direction | 86 | Locking device |
| 42 | Washer | 88 | Angular gear |
| 44 | Body | 90 | Locking device |
| 46 | Body | 92 | Angular gear |
| 48 | Body | 94 | Locking ring |
| 50 | Component | 96 | Bearing flange |
| 52 | Component | 98 | Driven shaft |
| 54 | Needle roller bearing | 100 | Driven shaft |
| 102 | Toolholder | 148 | Claw |
| 104 | Tool | 150 | Claw |
| 106 | Housing part | 152 | Internal toothing |
| 108 | Toothed gear | 154 | Sliding bearing |
| 110 | Toothed gear | 156 | Driven pulley |
| 112 | Housing | 158 | Claw |
| 114 | Handle | 160 | Claw |
| 116 | Handle | 162 | Claw |
| 118 | Fan wheel | 164 | Claw |
| 120 | Snapring | 166 | Ball bearing |
| 122 | Shim | | |
| 124 | Felt ring | | |
| 126 | Ball bearing | | |
| 128 | Rubber ring | | |
| 130 | Locking ring | | |
| 132 | Splined shaft | | |
| 134 | Felt ring | | |
| 136 | Dust cap | | |
| 138 | Fastening screw | | |
| 140 | Pinion | | |
| 142 | Driven pulley | | |
| 144 | Claw | | |
| 146 | Claw | | |

What is claimed is:

1. A power tool comprising a toolholder (12,102) driveable in at least rotary fashion via a driven shaft (10, 98, 100), which comprises a workholding fixture (14) for attaching tools (16, 104) actuatable in the direction of rotation of the driven shaft (10, 98, 100), and comprising a locking device (18, 86, 90), via which the driven shaft (10, 98, 100) is coupleable to and from a housing part (20, 106) in torsion-resistant fashion for locking and releasing the working fixture (14), and which opens automatically when torque is transferred from the drive motor to the toolholder (12, 102) and locks automatically when torque is transferred from the toolholder to the drive motor,
wherein the locking device (18, 86, 90) is located on the driven shaft (10, 98, 100),
wherein the locking device (18, 90) comprises a washer (42) that comprises at least one driving element (32, 34) for transferring torque, wherein the washer (42) is located on a first bearing seat (36) of the driven shaft (10, 100) in torsion-resistant fashion, and the toothed gear (22, 110) is located on a second bearing seat (38) of the driven shaft (10, 100) in rotatable fashion.

2. The power tool according to claim 1, wherein one part of the locking device (18, 86, 90) is formed by a toothed gear (22, 108, 110) located on the driven shaft (10, 98,100).

3. The power tool according to claim 2, wherein the locking device (18, 90) is developed as claw clutch that comprises at least one claw (24, 26, 28, 30) that is secured in the toothed gear (22, 110).

4. The power tool according to claim 3, wherein the claw (24, 28, 28 30) is formed by a bolt having a round cross-sectional area.

5. The power tool according to claim 1, wherein the driven shaft (10) is fixed in position in at least one axial direction (40) via the washer (42).

6. The power tool according to claim 1, wherein the driven shaft (10, 100) has a cross-section deviating from a cylindrical shape in the region of the first seat of the roller bearing (36) to form a geometrical positive connection with the washer (42).

7. The power tool according to claim 1, wherein the washer (42) is located on a side of the toothed gear (22) facing the toolholder (12).

8. The power tool according to claim 1, wherein in an arresting position of the looking device (18), the driven shaft (10) is supported in a component (50) in the direction of rotation via the washer (42) and via it least one body (44, 46, 48), via which component (50), moreover, bearing forces of the driven shaft (10) are supported in the housing part (20).

9. The power tool according to claim 8, wherein the bearing forces in the component (50) are supported via a pot-shaped component (52) designed separately from the component (50).

10. The power tool according to claim 1, wherein the locking device (86) is located in the power flux of the drive motor in front of an angular gear (88).

11. The power tool according to claim 10, wherein at least one part (94) of the locking device (90) is rigidly connected to a component (96) by means of the manufacture of this component (96) of the angular gear (92).

12. The power tool according to claim 1, wherein the locking device (90) is located in the power flux of the drive motor after an angular gear (88).

13. The power tool according to claim 12, wherein the locking ring (94) of the locking device (90) is injected into a bearing flange (96) of the angular gear.

14. A power tool comprising a toolholder (12, 102) driveable in at least rotary fashion via a drive motor and via a driven shaft (10, 98, 100), which comprises a workholding fixture (14) for attaching tools (16, 104) actuatable in the direction of rotation of the driven shaft (10, 98, 100), and comprising a locking device (18, 86, 90), via which the driven shaft (10, 98, 100) is coupleable to and from a housing part (20, 106) in torsion-resistant fashion for locking and releasing the workholding fixture (14), and which opens automatically when torque is transferred from the drive motor to the toolholder (12, 102), and which locks automatically when torque is transferred from the toolholder (12, 102) to the drive-motor,
wherein the locking device (18, 86, 90) comprises a washer (42) with at least one driving element (32, 34) for transmitting torque to at least one claw (24, 26, 28, 30, 142, 144, 146, 148, 158, 160, 162, 164) of one of a driven pulley (142, 156) or a toothed gear (22),
wherein the driving elements (32, 34) are shaped in such a way to be rotatable with limitation between adjacent claws (24, 26, 28, 30, 142, 144, 146, 148, 158, 160, 162, 164),
wherein the washer (42) has a nearly cylindrical basic shape on its outer circumference abutting the drive elements (32, 34), which transitions into a flat spot (74, 76) each in the center between the adjacent driving elements (32, 34),
wherein the washer (42) is surrounded by a locking ring (48, 86, 94), and
wherein in the regions of the flat spots (74, 76) of the washer (42) cylindrical rolling elements (42, 46) are accommodated between the washer (42) and the locking ring (48, 86, 94).

15. A power tool comprising a toolholder (12, 102) driveable in at least rotary fashion via drive motor and via a driven shaft (10, 98, 100), which comprises a workholding fixture (14) for attaching tools (16, 104) actuatable in the direction of rotation of the driven shaft (10, 98, 100), and comprising a locking device (18, 86, 90), via which the driven shaft (10, 98, 100) is coupleable to and from a housing part (20, 106) in torsion-resistant fashion for locking and releasing the workholding fixture (14), and which opens automatically when torque is transferred fro the drive motor to the toolholder (12, 102), and which locks automatically when torque is transferred from the toolholder (12, 102) to the drive-motor, wherein the locking device (18, 86,90) is located on the driven shaft (10, 98, 100), wherein the locking device (18, 36, 90) comprises a washer (42) with at least one driving element (32, 34) for transmitting torque to at least one claw (24, 26, 28, 30, 142, 144, 146, 148, 158, 160, 162, 164) of one of a driven pulley (142, 156) or a toothed gear (22), wherein the driving element (32, 34) is shaped in such a way to be rotatable with limitation between adjacent claws (24, 26, 28, 30, 142, 144, 146, 148, 158, 160, 162,164)

wherein the washer (42) is located on a first bearing seat (36) of the driving shaft (10, 100) in torsion-resistant fashion, and the toothed gear (22, 110) is located on a second bearing seat (38) of the driven shaft (10, 100) in a rotatable fashion, wherein the washer (42) is surrounded by a locking ring (48, 86, 94 and wherein in the region of flat spots (74, 76) of the washer (42) cylindrical rolling elements (44, 46) are accommodated between the washer (42) and the locking ring (48, 86, 94).

16. A power tool comprising a toolholder (12, 102) driveable in at least rotary fashion via a drive motor and via a driven shaft (10, 98, 100), which comprises a workholding fixture (14) for attaching tools (16, 104) actuatable in the direction of rotating of the driven shaft (10, 98, 100), and comprising a locking device (18, 86, 90), via which the driven shaft (10, 98, 100) is coupleable to and from a housing part (20, 106) in torsionresistant fashion for locking and releasing the workholding fixture (14) and which opens automatically when torque is transferred from the drive motor to the toolholder (12, 102), and which locks automatically when torque is transferred from the toolholder (12, 102) to the drive-motor, wherein the locking device (18, 86, 90) is located on the driven shaft (10, 98, 100), wherein one part of the locking device (18, 86, 90) is formed by a tooted gear (22, 108, 110) located in the driven shaft (10, 98, 100), wherein the locking device (18, 90) is developed as claw clutch that comprises at least one claw (24, 26, 28, 30) that is secured in the toothed gear (22, 110), and wherein the claw (24, 26, 28, 30 is formed by a bolt having a round cross sectional area.

17. A power tool comprising a toolholder (12, 102) driveable in at least rotary fashion via a drive motor and via a driven shaft (10, 98, 100), which comprises a workholding fixture (14) for attaching tools (16, 104) actuatable in the direction of rotating of the driven shaft (10, 98, 100), and comprising a locking device (18, 86, 90), via which the driven shaft (10, 98, 1000) is coupleable to and from housing part (20, 106) in torsionresistant fashion for locking and releasing the workholding fixture (14), and which opens automatically when torque is transferred from the drive motor to the toolholder (12, 102), and which locks automatically when torque is transferred from the toolholder (12, 102) to the drive-motor, wherein the locking device (18, 86, 90) is located on the driven shaft, (10, 98, 100), wherein the locking device (18, 90) comprises a washer (42) that comprises at least one driving element (32, 34) for transferring torque, wherein the washer (42) is located on a first bearing seat (36) of the driven shaft (10, 100) in torsion-resistant fashion, and a toothed gear (22, 110) is located on a second bearing seat (38) of the driven shaft (10,100), in rotatable fashion, wherein, in an arresting position of the locking device (18), the driven shaft (10) is supported in a component (50) in the direction of rotating via the washer (42) and via at least one body (44, 48, 48), via which component (50), moreover, bearing forces of the driven shaft (10) are supported in the housing part (20).

18. A power tool comprising a toolholder (12, 102) driveable in at least rotary fashion via a drive motor and via a driven shaft (10, 98, 100), which comprises a workholding fixture (14) for attaching tools (16, 104) actuatable in the direction of rotation of the driven shaft (10, 98, 100), and comprising a locking device (18, 86, 90), via which the driven shaft (10, 98, 100) is coupleable to and from a housing part (20, 106) in torsion resistant fashion for locking and releasing the workholding fixture (14), and which opens automatically when torque is transferred from the drive motor to the toolholder (12, 102), and which locks automatically when torque is transferred from the toolholder (12, 102), to the drive-motor, wherein the locking device (18, 90) comprising a washer (42) that comprises at least one driving element (32, 34) for transferring torque, wherein the washer (42) is located on a first bearing seat (36) of the driven shaft (10, 100) in torsion-resistant fashion, and the toothed gear (22, 110) is located on a second bearing seat (38) of the driven shaft (10, 100 in rotatable fashion, wherein, in an arresting position of the locking device (18), the driven shaft (10) is supported in a component (50) in the direction of rotation via the washer (42) and via at least one body (44, 46, 48), via which component (50), moreover, bearing forces of the driven shaft (10) are supported in the housing part (20), and wherein the bearing forces in the component (50) are supported via a pot-shaped component (52) designed separately from the component (50).

19. A power tool comprising a toolholder (12, 102) driveable in at least rotary fashion via a drive motor and via a driven shaft (10, 98, 100), which comprises a workholding fixture (14) for attaching tools (16, 104) actuatable in the direction of rotation of the driven shaft, (10, 98, 100), and comprising a locking device (18, 86, 90), via which the driven shaft (10, 98, 100) is coupleable to and from a housing part (20, 106) in torsionresistant fashion for locking and releasing the workholding fixture (14), and which opens automatically when torque is transferred from the drive motor to the toolholder (12, 102), and which locks automatically when torque is transferred from the toolholder (12, 102)) to the drive-motor, wherein the locking device (18, 86, 90) is located on the driven shaft (10, 98, 100), and wherein the locking device (86) is located in the power flux of the drive motor in front of an angular gear (88).

20. A power tool comprising a toolholder (12, 102) driveable in at least rotary fashion via a drive motor and via a driven shaft (10, 98, 100), which comprises a workholding fixture (14) for attaching tools (16, 104) actuatable in the direction of rotating of the driven shaft (10, 98, 100), and comprising a locking device (18, 86, 90), via which the driven shaft (10, 98, 100) is coupleable to and from a housing part (20, 106) in torsionresistant fashion for locking and releasing the workholding fixture (14), and which opens automatically when torque is transferred from the drive motor to the toolholder (12, 102), and which locks automatically when torque is transferred from the toolholder (12, 102) to the drive-motor, wherein the locking device (18, 86, 90) is located on the driven shaft (10, 98, 100), and wherein the looking device (90) is located in the power of the drive motor after an angular gear (88).

21. A power tool comprising a toolholder (12, 102) driveable in at least rotary fashion via a drive motor and via a driven shaft (10, 98, 100), which comprises a workholding fixture (14) for attaching tools (16, 104) actuatable in the direction of rotation of the driven shaft (10, 98, 100) and comprising a locking device (18, 86, 90), via which the driven shaft (10, 98, 100) is coupleable to and from a housing part (20, 106) in torsionresistant fashion for locking and releasing the workholding fixture (14), and which opens automatically when torque is transferred from the drive motor to the toolholder (12, 102), and which locks automatically when torque is transferred from the toolholder (12, 102) to the drive motor, wherein the locking device (18, 88, 90) is located on the driven shaft (10, 98, 100), and wherein at least one part (94) of the locking device (90) is rigidly connected to a component (96) by means of the manufature of this component of an angular gear (92).

22. A power tool comprising a toolholder (12, 102) driveable in at least rotary fashion via a drive motor and via a driven shaft (10, 98, 100), which comprises a workholding fixture (14) for attaching tools (16, 104) actuatable in the direction of rotation of the driven shaft (10, 98, 100) and comprising a locking device (18, 86, 90), via which the driven shaft (10, 98, 100) is coupleable to and from a housing part (20, 106) in torsionresistant fashion for locking and releasing the workholding fixture (14), and which opens automatically when torque is transferred from the drive motor to the toolholder (12, 102), and which locks automatically when torque is transferred from the toolholder (12, 102) to the drive motor, wherein the locking device (18, 86, 90) is located on the driven shaft (10, 98, 100), and wherein a locking ring (94) of the locking device (90) is injected into a bearing flange (96) of an angular gear.

23. A power tool, comprising a toolholder (12, 102) driveable in at least rotary fashion via a drive motor and via a driven shaft (10, 98, 100), which comprises a workholding fixture (14) for attaching tools (16, 104) actuatable in the direction of rotation of the driven shaft (10, 98, 100), and comprising a locking device (18, 86, 90), via which the driven shaft (10, 98, 100) is coupleable to and from a housing part (20, 106) in torsion-resistant fashion for locking and releasing the workholding fixture (14), and which opens automatically when torque is transferred from the drive motor to the toolholder (12, 102), and which locks automatically when torque is transferred from the toolholder (12, 102) to the drive-motor, wherein the locking device (18, 86, 90) is locked on the driven shaft (10, 98, 100), wherein the locking device (18, 90) is developed as claw clutch that comprises a pulling element (22, 142, 156) with at least one claw (24, 26, 28, 30), said locking device (18, 86, 90) comprising a washer (42) located on a bearing seat (36) of the driven shaft (10, 98, 100) in torsion-resistant fashion, said driven shaft (10, 100) having a cross-section deviating from a cylindrical shape in the region of hearing seat (36) of the driven shaft (10, 98, 100) to form a geometrical positive connection with the washer (42), said washer (42) comprising at least one driving element (32, 34) for transmitting torque to said claw, the driving element having a rounded surface for engagement with said claw, wherein the driving element (32, 34) is shaped in such a way to be rotatable with limitation between adjacent claws, wherein the washer (42) having regions of flat spots (74, 76), in which cylindrical rolling elements (44, 46) are accommodated between the washer (42) and a locking ring (48, 86, 94), said locking ring (48, 86, 94) surrounding said washer, wherein, in an arresting position of the locking device (18), the driven shaft (10) is supported in a component (50) in the direction of rotation via the washer (42) and via at least one body (44, 46, 48), via which component (50), moreover, bearing forces of the driven shaft (10) are supported in the housing part (20).

24. A power tool, comprising a tool holder (12, 102) driveable in at least rotary fashion via a drive motor and via a driven shaft (10, 98, 100), which comprises a workholding fixture (14) for attaching tools (16, 104) actuatable in the direction of rotation of the driven shaft (10, 98, 100), and comprising a locking device (18, 88, 90), via which the driven shaft (10, 98, 100) is coupleable to and from a housing part (20, 108) in torsion-resistant fashion for locking and releasing the workholding fixture (14), and which opens automatically when torque is transferred from the drive motor to the toolholder (12, 102), and which locks automatically when torque is transferred from the toolholder (12, 102) to the drive-motor, wherein the locking device (18, 86, 90) is located on said driven shaft (10, 98, 100), wherein one part of the locking device (18, 86, 90) is formed by a toothed gear (22, 108, 110) rotatable relative to the driven shaft (10, 98, 100), the toothed gear comprising at least one claw (24, 26, 28, 30) secured in the toothed gear (22, 110), wherein the locking device (18, 86, 90) comprises a washer (42) with at least one driving element (32, 34) for transmitting torque to a toothed gear (22), said washer (42) being located on a bearing seat (36) of the driven shaft (10, 100) in torsion-resistant fashion, said driven shaft (10, 100) having a cross-section deviating from a cylindrical shape in the region of said bearing seat (36) of the driven shaft (10, 98, 100) to form a geometrical positive connection with the washer (42), said washer (42) having regions of flat spots (74, 76), wherein in the regions of the flat spots (74, 76) of the washer (42) cylindrical rolling elements (44, 46) are accommodated between the washer (42) and a locking ring (48, 86, 94), said locking ring (48, 86, 94) surrounding the washer, wherein, in an arresting position of the locking device (18), the driven shaft (10) is supported in a component (50) in the direction of rotation via the washer (42) and via said cylindrical rolling elements (44, 46) via which component (50), moreover, bearing forces of the driven shaft (10) are supported in the housing part (20).

25. A power tool comprising a toolholder (12, 102) driveable in at least rotary fashion via a driven shaft (10, 98, 100), which comprises a workholding fixture (14) for attaching tools (16, 104) actuatable in the direction of rotation of the driven shaft (10, 98, 100), and comprising a locking device (18, 86, 90), via which the driven shaft (10, 98, 100) is coupleable to and from a housing part (20, 106) in torsion-resistant fashion for locking and releasing the working fixture (14), and which opens automatically when torque is transferred from the drive motor to the toolholder (12, 102) and locks automatically when torque is transferred from the toolholder to the drive motor, wherein the locking device (18, 86, 90) is located on the driven shaft (10, 98, 100), wherein the locking device (18, 86, 90) comprises a locking ring (48, 86, 94) surrounding the driven shaft (10, 98, 100) and a washer (42), said washer (42) being located on a bearing seat (36) of the driven shaft (10, 98, 100) in torsion-resistant fashion, said driven shaft (10, 98, 100) having a cross-section deviating from a cylindrical shape in the region of said bearing seat (36) of the driven shaft (10, 98, 100) to form a geometrical positive connection with the washer (42), wherein upon torque is transferred from the tool holder (12, 102) to the drive motor rolling elements (44, 46) of the locking device (18, 86, 90) are automatically radially cramped between the washer (42) d the locking ring (48, 86, 94) for non-rotatably coupling the driven shaft (10, 98, 100) to the housing part, wherein upon torque is transferred from the drive motor to the tool holder (12, 102) said rolling elements (44, 46) are automatically released for allowing a rotation of the driven shaft (10, 98, 100) relative to the housing part.

* * * * *